United States Patent [19]

Halvorsen et al.

[11] Patent Number: 4,614,202
[45] Date of Patent: Sep. 30, 1986

[54] FUEL DISTRIBUTION VALVE

[75] Inventors: Robert M. Halvorsen, Birmingham; Jeffrey B. Hurst, Troy, both of Mich.

[73] Assignee: Ex-Cell-O Corporation, Troy, Mich.

[21] Appl. No.: 605,322

[22] Filed: Apr. 30, 1984

Related U.S. Application Data

[63] Continuation of Ser. No. 300,719, Sep. 10, 1981, abandoned.

[51] Int. Cl.⁴ .............................................. F16K 11/07
[52] U.S. Cl. .................................. 137/118; 137/454.2; 137/625.48; 29/157.1 R
[58] Field of Search ................ 137/118, 625.48, 454.2; 29/157.1 R

[56] References Cited

U.S. PATENT DOCUMENTS 2,701,609  2/1955  Thorpe et al. ..................... 137/118
3,833,988  9/1974  Tobias ............................. 29/157.1 R
4,226,365 10/1980  Norris et al. ...................... 137/118

Primary Examiner—Alan Cohan
Attorney, Agent, or Firm—Edward J. Timmer

[57] ABSTRACT

A fuel flow distribution valve includes a valve body having a bore with a spring biased pressure responsive valve therein. The valve and an associated valve bore wall include first and second sets of slots or holes therein formed simultaneously when the valve is in a fixed position within the bore wall to cause each of said flow metering slots or holes to be located in direct communication with discharge ports thereby to minimize and simplify internal manifolding and passages within said valve body.

5 Claims, 8 Drawing Figures

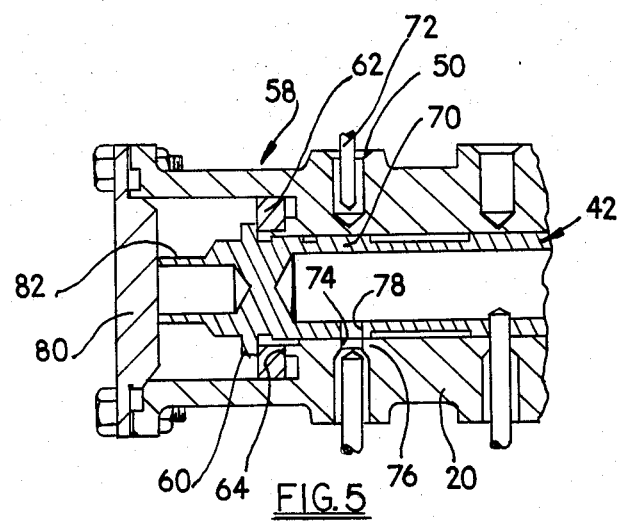
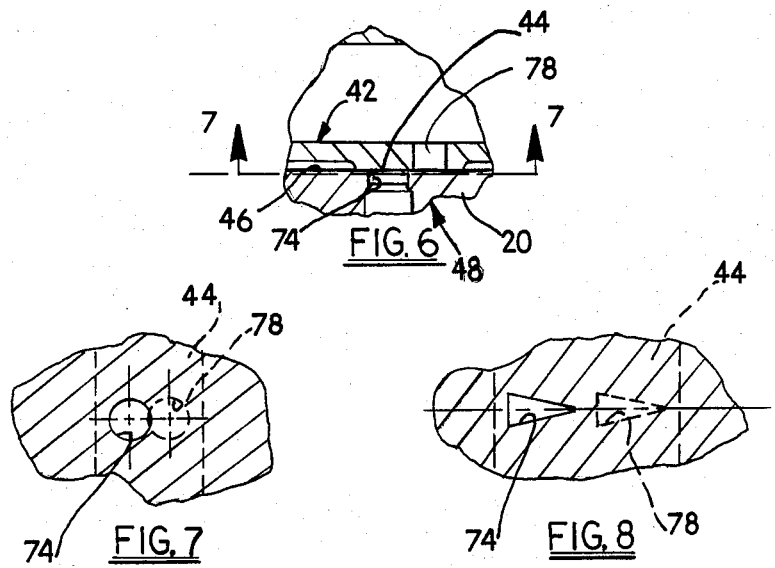

FUEL DISTRIBUTION VALVE

This application is a continuation of application Ser. No. 300,719 filed Sept. 10, 1981, now abandoned.

TECHNICAL FIELD

This invention relates to fuel flow distribution valves and more particularly to such valves which utilize a valve having at least one metering edge which slides within a liner or sleeve having a plurality of metering slots or holes.

BACKGROUND OF THE INVENTION

Current state-of-art fuel flow distribution valves for supplying fuel nozzles in a gas turbine engine utilize a spring biased pressure responsive valve with a single or multiple metering edge which slides within a liner or sleeve having a plurality of metering slots or holes. In operation the metering edge or edges slide across the metering slots or holes to meter and to divide fuel flow to the fuel nozzles. Such single edge metering requires precise location of the plurality of slots or holes in the liner and precise location of the slots or holes with respect to each other and to the metering edge or edges. Also, in such arrangements the precise location of holes or slots and the reference edges can require elaborate internal passages or manifolding to connect the holes or slots to specified valve discharge port locations.

SUMMARY OF THE INVENTION

An object of the present invention is to provide an improved fuel flow distribution valve including means for metering fuel from a controlled fuel source to a plurality of individual fuel nozzles without requiring precise location of slots or holes to a single metering edge and to permit placement of the holes or slots in a location so as to minimize and simplify internal manifolding and passages in the valve.

A further object of the present invention is to provide a fuel flow distribution valve of the type set forth in the preceding object wherein the means for metering includes a translatable valve and stationary wall means having a plurality of pairs of flow metering holes or slots therein arranged and formed without requiring precise location of fuel metering slots or holes and to permit placement of the holes or slots in a location so as to minimize and simplify internal manifolding and passages in the valve.

A further object of the invention is to provide a fuel flow distribution valve by means including a translatable valve fit with respect to a liner and slidable with respect thereto under spring biasing and inlet pressure control, and wherein metering holes and slots are machined in line with one another in the valve and liner while the valve is fixed in the liner to form a plurality of pairs of flow controlling holes or slots each communicating with the inlet to the fuel flow distribution valve and each being connected to a single discharge fitting for connection to one of a plurality of fuel nozzles for supplying fuel to the burner of a gas turbine engine wherein each of the pairs of flow control holes is responsive to inlet pressure to produce a variable flow area at each pair of holes for dividing and metering flow from the inlet to a plurality of discharge conduits during control of fuel to the plurality of nozzles.

Still another object of the present invention is to provide a fuel flow distribution valve of the type set forth in the preceding objects wherein the valve and liner are held in a single fixed position with respect to one another as the plurality of sets of flow metering holes or slots are formed therein while the valve is located within the liner so as to produce a plurality of sets of in-line machined holes or slots, movable in response to pressure at the inlet of the valve to produce a simultaneously increased flow area at each of the holes to divide and meter fuel flow to each of the fuel nozzles in accordance with the inlet fuel pressure.

Yet another object is to provide an improved fuel flow distribution valve of the type set forth in the preceding objects wherein means are provided to fix the valve at staggered locations with respect to the liner as pairs of holes or slots are machined in line in the valve and the liner so as to produce a staged distribution of fuel from the valve as the translatable valve moves with respect to the liner.

Another object of the present invention is to provide an improved method for manufacturing a fuel flow distribution valve for distributing metered fuel to a plurality of fuel nozzles comprising aligning a valve element in at least one fixed location within a liner for slidably supporting the valve in a close tolerance diametral fit with the walls of the liner, clamping the valve into its fixed relationship, holding the valve against rotation, and concurrently machining in line holes from the liner and the valve when the valve is fixed within the liner to form a plurality of pairs of metering holes or slots through the valve and the liner, and thereafter locating the valve in a control position with respect to the liner which is off-set with respect to the fixed location.

Yet another object of the invention is to provide the improved method of the preceding object wherein the valve is fixed at staggered locations with respect to the liner as pairs of holes or slots are machined in line in the valve and the liner so as to produce a staged distribution of fuel from the valve as the translatable valve moves with respect to the liner.

This invention is characterized by a fuel flow distribution valve having a housing with a liner slidably supporting a valve that is in a close tolerance fit with the liner to prevent leakage at the boundary layer therebetween and wherein end surfaces are formed on the liner and valve to accommodate a shim to produce at least one fixed offset relationship between the liner and valve wherein in-line holes or slots are machined in the liner and valve to form a plurality of pairs of flow controlling holes or slots therein, said surfaces being engagable upon removal of the shim to position the valve in a first flow controlling position with respect to the holes or slots in the liner and wherein means are provided to index the valve against rotation with respect to the liner as the liner is moved against spring force in response to the inlet fuel pressure to the fuel flow distribution valve so as to slide each of the holes or slots of the valve with respect to a hole or slot in the liner so as to produce either simultaneous or staged distribution of fuel from the inlet to a plurality of discharge ports on the valve housing without requiring precise location of fuel metering slots or holes and to permit placement of the holes or slots in a location so as to minimize and simplify internal manifolding and passages in the valve.

Other features and advantages will be apparent from the specification and claims and from the accompanying drawings which illustrate preferred embodiments of the invention.

BRIEF DESCRIPTION OF THE DRAWINGS

FIG. 5 is a cross-sectional view of one end of the valve and housing showing the relationship of the component parts of the assembly during manufacture of flow controlling holes or slots therein;

FIG. 6 is an enlarged, fragmentary sectional view of a pair of fuel metering ports;

FIG. 7 is a sectional view along line 7—7 of FIG. 6; and

FIG. 8 is a view like FIG. 7 showing another embodiment of a pair of fuel metering ports;

Referring now to FIG. 1, a fuel flow distribution valve 10, in accordance with the present invention, is connected to a fuel control 12 for a gas turbine engine which includes an outlet conduit 14 connected to the inlet port 16 of a valve housing inlet 18. The valve housing inlet is connected to a tubular valve housing 20 at an inlet flange 22 thereon by mating end flange 24 of the inlet housing to the flange 22 and connecting it thereto by a plurality of fastening means, representatively shown, as a plurality of nuts and bolts 26, 28. The flanges are sealed with respect to one another by an annular 0-ring 30.

Figure 1:
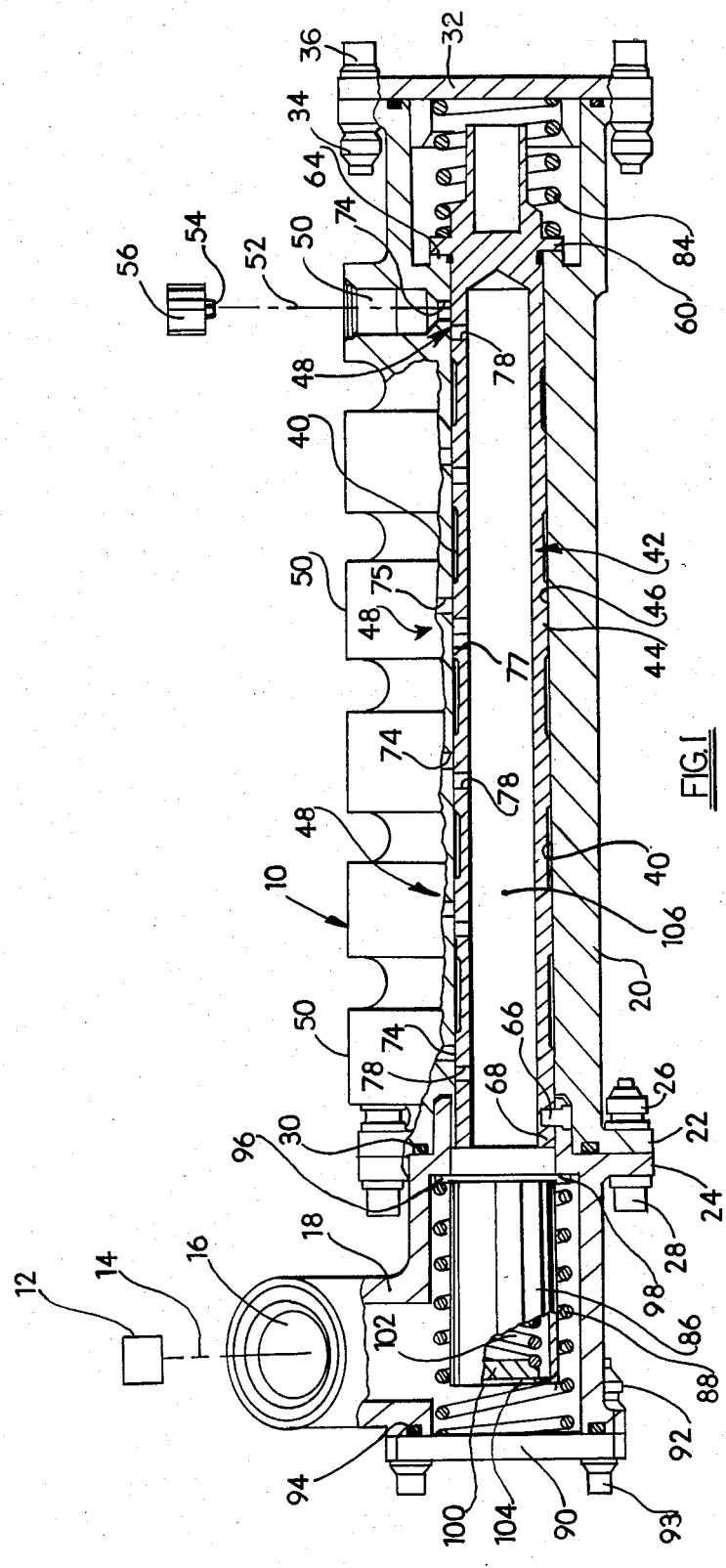
FIG. 1 is a longitudinal sectional view of a fuel flow distribution valve in accordance with the present invention.

The tubular housing 20, in the illustrated embodiment, is closed at one end by an end closure plate 32 connected to housing 20 by nuts and bolts 34, 36. Plate 32 is sealed to housing 20 by an O-ring seal 38. The valve housing 20 has wall means defining a bore 40 formed therethrough which supports an elongated valve 42.

More particularly, the valve 42 is translatable with respect to the bore 40. It includes a plurality of axially spaced annular lands 44 thereon which are located in a close tolerance fit relationship with the inner wall surface 46 defining the bore 40. The lands 44 and surface 46 define a plurality of axially spaced, annular interface fuel flow control regions 48.

The housing 20 has a plurality of discharge ports 50 formed integrally thereof. In the illustrated arrangement, six of the ports are formed on one side of the valve and six of the discharge ports 50 are formed on the opposite side of the valve. An individual nozzle conduit 52 is connected to each discharge port 50 and at the opposite end to the inlet fitting 54 of one nozzle 56 of a plurality of nozzles, in the illustrated arrangement, constituting twelve separate nozzles located in a ring configuration for supplying fuel to the burner of a gas turbine engine.

The flow distribution valve as described herein is most commonly intended for usage in the fuel system of a gas turbine engine to provide metered fuel flow to the low back pressure high flow system of a dual system fuel nozzle or to the low back pressure system of a single system type nozzle typical examples of which are contained in U.S. Pat. No. 3,684,186 issued to Mr. William F. Helmrich of Ex-Cell-O Corporation.

The fuel flow distribution valve 10, as will be described, defines a separate fuel source and fuel manifold system with fuel flow controlled in accordance with fuel pressure at the inlet port 16 of the valve 10 to supply the nozzles 56. The nozzles thus constitute separately supplied fuel nozzle assemblies with fuel flow control thereto in accordance with inlet pressure to the fuel distribution valve 10.

In accordance with one principle of the present invention, the valve 42 is manufactured within the bore 40 of the fuel flow distribution valve 10.

More particularly, referring to FIG. 5, a final finishing method for valve and liner or housing metering slots or holes is shown. A valve end 58 of the valve housing 20 is shown partially fabricated. The valve 42 has a flange 60 thereon that is engaged by a spacer shim 62 which is seated against an annular reference surface 64 on an integrally formed rib inboard of the valve end 58. The spacer shim 62 axially positions the valve 42 with respect to the valve housing 20 (as shown in FIG. 1). A pin 66 located in a slot 68 at the opposite end of the sleeve holds it against rotation with respect to the valve housing 20 during the finishing method.

As shown in FIG. 5, the valve 42 at each of the flow control regions 48 is initially a solid wall 70. The solid wall 70 is aligned by the spacer shim 62 with one of the discharge ports 50. A metering port forming tool 72, as shown at the upper side of the housing end 58, is inserted through the discharge port 50 to form a slot or hole 74 in a solid wall portion 76 of the valve housing 20. A like slot or hole 78 is formed in the solid wall 70. The hole 78 is in line and congruent with hole 74 formed by the tool 72 in the wall 76. In the illustrated arrangement, a clamping head 80 is held against an extension 82 on the valve to secure the flange 60 and the spacer shim 62 against the reference surface 64 so that the valve will be precisely, axially fixed with respect to the housing 20 during the formation of all valve and housing fuel metering ports. In the illustrated arrangement all these ports are formed in an in-line relationship with the valve 42 in the same fixed relationship to housing 20. It is to be noted that one spacer thickness is used to position the pairs of holes or slots for simultaneous metering to all discharge ports 50. Multiple spacers of varying spacer thicknesses can be used to position pairs of the holes or slots in different offset positions as shown at holes 75, 77 in FIG. 1 to obtain in-line characteristics of metering slots or holes which produce staged port metering if required.

Because of the in-line and congruent formation of the holes 74, 78 a plurality of pairs of fuel flow ports are formed in the valve housing 20 at the fuel flow control regions 48. In operation, the shim or shims are removed from the assembly and a spring 84 is located between the flange 60 and the closure 32 as shown in FIG. 1 so as to shift the valve 42 from its finishing position to the position shown in FIG. 1 where the flange 60 engages the reference surface 64 to define a fuel shut-off position of the valve with respect to the housing 20. In this position each of the holes or slots 78 is shifted to one side of the previously formed hole 74 in the housing 20. As shown in FIG. 1, in this position, the pairs of fuel controlling holes or slots are out of alignment to represent a first fuel control position wherein fuel flow from the controller 12 is blocked from flow through the discharge ports 50. The pairs of holes or slots define a metering and distribution means that does not require the precise location of the metering slots or holes and that also permits the placing of these metering slots or holes in such a position so as to minimize and simplify internal manifolding and passages.

The fuel flow through the inlet port 16 is across a self-relieving filter element 86 that is held by a surrounding compression spring 88 that is biased against an inlet end closure plate 90 secured to the housing 18 by a plurality of nuts and bolts 92, 93. The plate 90 is sealed with respect thereto by an O-ring 94. The opposite end of spring 88 is seated on a flange 96 of the filter that is held against a seat 98 formed around the bore 40 at the inlet end of the housing.

The filter is partially broken away in FIG. 1 to show a pressure relief valve 100 that is held normally closed by a relief spring 102 against a seat that surrounds a relief port 104 for bypassing the filter 86 when it is blocked. The normal build-up of control pressure at the inlet port 16 will be reflected by a build-up of pressure within the internal bore 106 of the valve 42. This build-up acts against the closing pressure of the spring 84 to cause a simultaneous movement of each one of the valve holes or slots 78 with respect to the valve housing holes or slots 74 at each of the flow control regions 48.

The formed metering ports are better shown in FIG. 6 wherein each of the regions 48 is enlarged to show that either formed slots or round holes will initially open a small flow area at each of the regions 48. The opening is simultaneous in the case of holes 74,78. In the case of holes or slots 75,77 in FIG. 1, opening of the valve occurs to produce staged port metering.

The valve components are all pre-assembled to a total diametrical clearance of from 0.0002 inches to 0.0004 inches to prevent leakage between the outer surface of each of the lands and the inner surface of the bore 40 in FIG. 1.

In FIG. 8 the fuel metering ports are shown as triangular slots formed respectively in the valve housing and the valve. Such shapes are easily formed by precision electro-discharge machining methods by insertion of the electro tools through the discharge ports 50 and the interior of the valve when in the fixtured position of the part shown in FIG. 5.

Another form of metering is shown in FIG. 7 wherein the fuel metering is provided in the form of round holes which are precision drilled and reamed through the housing and valve when fixtured as shown in the embodiment of FIG. 5.

The illustrated arrangement eliminates an intermediate internal liner component for the valve. Wrought aluminum construction can be used through the valve to retain high strength and corrosion characteristics. Hard anodic coatings can be provided on both the outer surface of the valve and the wall of the bore at wear surfaces thereon to retain maximum life and service characteristics.

Additionally, the pairs of formed metering holes are combined with one another along the length of the fuel distribution valve, on one side thereof to minimize manifolding. Only one side of the outer periphery of the distribution valve is connected to a fuel nozzle conduit and fuel nozzle array. Thus the valve can be located in relatively confined locations wherein the exterior surface of the valve body 20 is locatable in close proximity to a housing wall of the engine.

Figure 2:
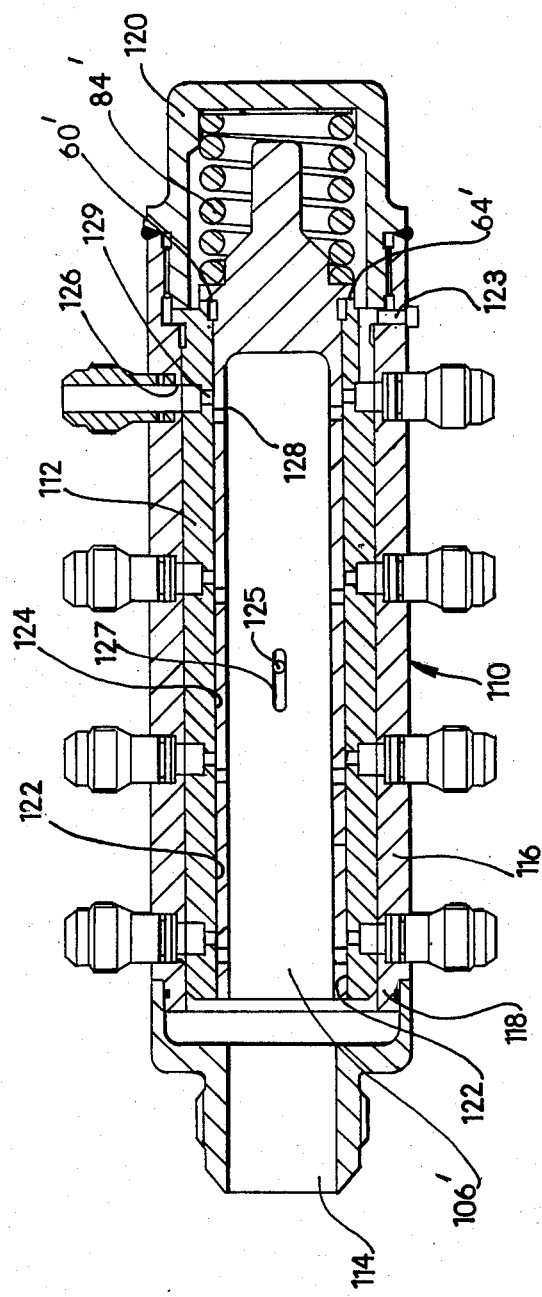
FIG. 2 is a longitudinal cross-sectional view of another embodiment of the fuel flow distribution valve of the present invention.

FIG. 2 shows another embodiment of a fuel flow distribution valve 110, with an intermediate liner 112. The valve housing inlet 114 is connected to a tubular valve housing 116 at an inlet end 118 thereon.

The tubular housing 116, in the illustrated embodiment, is closed at one end by an end closure 120. The liner 112 has wall means defining a bore 122 formed therethrough which supports an elongated valve 124.

More particularly, the valve 124 is translatable with respect to the bore 122. Pin 123 controls the valve and liner position within housing 116. A pin 125 fixed to liner 112 fits in a slot 127 in valve 124 to prevent rotation of valve 124 in liner 112.

The housing 116 has a plurality of discharge ports 126. An individual nozzle conduit fitting is connected to each discharge port 126.

A plurality of pairs of fuel metering holes or slots 128,129 are formed in the valve 124 and intermediate liner 112. A spring 84' is located between the flange 60' and the closure 120 so as to bias the valve 124 against inlet fuel pressure. The flange 60' engages a reference surface 64' to define a fuel shut-off position of the valve 124. In this position each of the holes or slots 128 is shifted to one side of the previously formed hole 129 in the liner 112.

The control pressure at the inlet is applied within the internal bore 106' of the valve 124. This pressure acts against the closing bias of the spring 84' to cause a simultaneous movement of each one of the valve holes or slots 128 with respect to the liner holes or slots 129. The manufacture of the slots or holes occurs when the valve is fixed within the valve liner bore. Any manufacturing misalignment is reflected in each one of the in-line congruent holes which are produced during the finishing process. However, given ones of the pairs of metering holes or slots can be of different size to vary the distributed flow between discharge ports. Further, the liner is machined at a fixed position in this embodiment to produce simultaneous flow.

Figure 3:
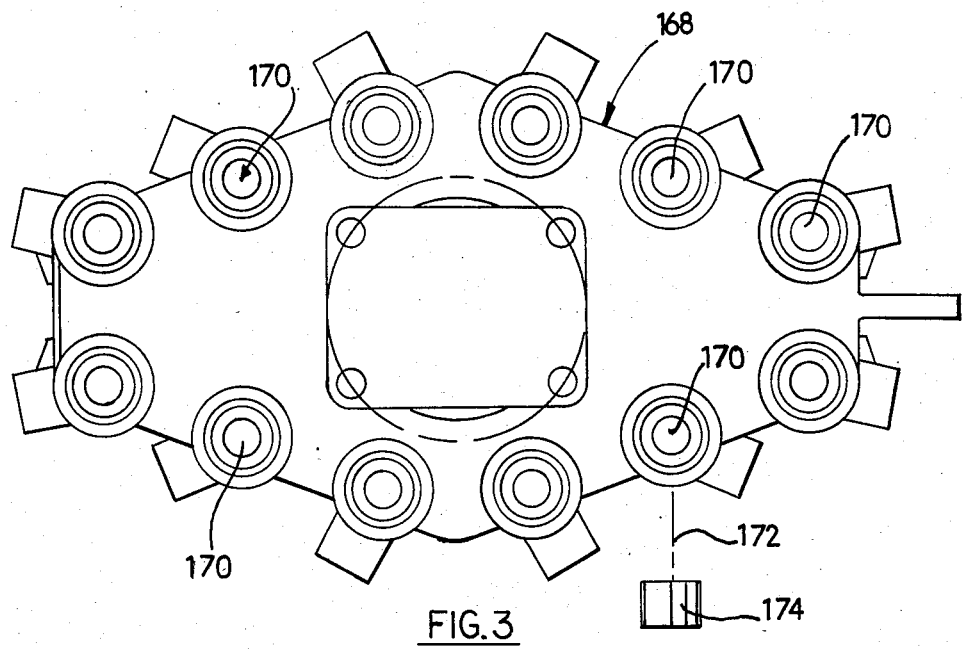
FIG. 3 is a top elevational view of the embodiment of FIG. 4.
Figure 4:
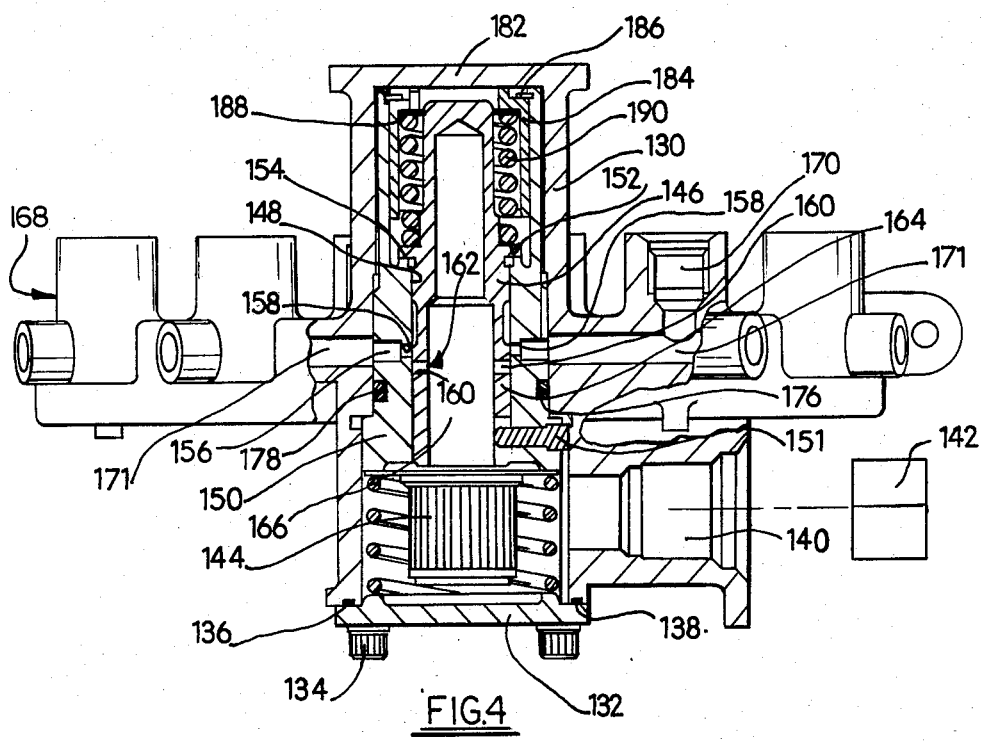
FIG. 4 is a longitudinal sectional view of another embodiment of the present invention.

Another embodiment of the present invention, set forth in FIGS. 3 and 4, has all metering slots or holes within one plane to suit a desired discharge port location. This arrangement includes a valve housing 130 that is closed by an end plate 132 at one end thereof, secured by a plurality of fastener means 134 to the housing 130 and sealed with respect thereto by an O-ring seal 136 in groove 138 of valve body 130. The valve housing 130 has an inlet 140 that directs fuel from a fuel controller 142 across a spring biased pressure relieved filter assembly 144 like that previously described in the first embodiment. The filtered fluid is directed against an elongated valve 146 that is in a close tolerance diametrical fit relationship with the wall of a bore 148 through a valve liner 150. The valve liner is fixed against rotation with respect to the valve body 130 by an anti-rotation pin 151. The valve 146 includes a flange 152 thereon corresponding to the positioning flange 60 on the valve 42 shown in FIG. 1. It is shown seated against a reference surface 154 on the liner 150 with it being understood that the flange 152, and surface 154 can be separated from one another to space the valve 146 in an offset relationship to the inner wall of bore 148. When in this position, a suitable machine tool is directed through a plurality of circumferentially spaced discharge ports 156 to form a plurality of pairs of congruent flow controlling holes or slots 158,160 at a flow control region 162 that is defined between a land 164 and the inner surface of the bore 148. The pairs of flow controlling metering holes or slots 158,160 are formed with the valve 146 fixed in place within the liner 150. As a result any tolerance deviation during formation of either of the pair of holes which are aligned with one another, will be common to both of the holes of a pair of flow controlling holes so that each of the pairs of holes will accurately meter fuel flow from the interior 166 of the valve 146 through the discharge ports 156 thence through a football configured distribution head 168 on the valve body 130.

The football shaped distribution head 168, more particularly, includes a plurality of upwardly facing discharge fittings 170. The head 168 includes a passage 171 directed radially from each discharge port 156. The head 168 has a substantially elliptically formed outer periphery which locates the twelve discharge fittings 170 in a direction which enables the body to be fitted in a space and all the conduits to extend axially from one direction of the location in which the body is secured. As a result the arrangement can easily be connected to a plurality of nozzle conduits 172 connected to nozzles 174.

The liner 150 is sealed with respect to the body by an O-ring seal 176 in a liner groove 178. The valve body 130 includes an integrally formed center section 180 that is closed at the upper end 182 thereof to eliminate the need for a seal at the spring biased end of the valve 146.

In this arrangement the liner 150 has a closure element or plate 184 located therein and retained by a snap ring 186 secured to the liner. A shim washer 188 is supported by the closure plate 184 to receive the end of a control spring 190 having the opposite end thereof secured to the flange 152 to impose a spring bias control on the sleeve 146 during valve operation.

As in the case of the first embodiment, as inlet pressure increases at the inlet port 142 the valve 146 will be moved upwardly against the biasing spring 190 until each hole 160 of the plurality of pairs of holes will open a like flow area through each of the pair of holes 158 at the regions 162 to produce a substantially equal flow of fuel from the flow control regions 162 to each of the discharge ports 170.

In this embodiment, the valve module, filter cartridge and filter hold down spring and cover are removable from the valve body 130 by removing the plate 136 so that the component parts can be removed.

The flow distribution valves as described herein provide a simple means to obtain improved fuel metering accuracy through the unique design of machining the valve and liner, or valve and housing metering ports or slots in line with one another while these parts are fastened together. The valve design also provides the ability to position the metering slot or holes in an unlimited amount of positions to suit the discharge port requirements without the need for any elaborate metering passages or manifolding.

What is claimed is:

1. A fuel flow distribution valve for dividing and metering fuel flow from a fuel source to nozzles for supplying fuel to an engine comprising valve body means having an inlet and a plurality of outlets, intermediate liner means forming a longitudinal valve bore in said valve body means, said intermediate liner means having a reference surface thereon, a valve slidably supported in said valve bore slidable longitudinally therein and having a close tolerance diametral fit therewith, said valve having a positioning surface engageable with said reference surface and movable to a spaced apart position therefrom, spring means for biasing the valve in a first direction with respect to the liner means to engage the positioning surface and reference surface, means for directing inlet pressure against the valve in opposition to the spring means, a plurality of pairs of in line-machined flow metering ports in said liner means and value with the ports in each pair being congruent by virtue of being machined simultaneously with a common tool in said liner means and said valve when said valve is in a fixed position in said bore with said positioning surface spaced a preselected longitudinal distance from said reference surface to define a plurality of spaced pairs of congruent flow metering ports that independently meter fuel flow from said inlet to aligned ones of said plurality of outlets with each pair being in a first fuel control position when said positioning surface and reference surface are spaced apart by said preselected longitudinal distance and in a second fuel central position when said position surface and reference surface are engaged by bias of said spring means and each pair located in direct communication with a respective discharge port thereby to simplify internal manifolding and passages within said valve body, said pairs of flow metering ports being movable between the first fuel control position and second fuel control position to meter flow without precise, prealignment of ports in said valve with ports in said liner means.

2. In the fuel flow distribution valve of claim 1, said valve being located in a single fixed position with respect to said bore when said flow metering ports are formed, said pairs of flow metering ports being in alignment with one another when the valve is in its single fixed position and said pairs of flow metering ports being operative to simultaneously distribute fuel from the valve body during control movement of the valve from said aligned position.

3. In the fuel flow distribution valve of claim 1, said valve being located in a plurality of fixed positions with respect to said bore when said flow metering ports are formed, at least one of said pairs of flow metering ports being formed at each of said plurality of fixed positions to produce a staggered plurality of pairs of flow metering ports operative to produce a staged distribution of fuel from said valve body during control movement of said valve.

4. A method for manufacturing a fuel flow distribution valve for distributing metered fuel to a plurality of nozzles for supplying fuel to an engine comprising: inserting an elongated valve longitudinally into a valve bore such that the valve bore wall longitudinally slidably supports the valve in close diametral fit and until a positioning surface on the valve engages a shim means and is spaced by said shim means a preselected longitudinal distance from means forming the bore to establish a first fuel control position, clamping the valve in the first fuel control position against translation and rotation with the positioning surface against said shim means, and forming multiple pairs of flow controlling ports in the wall of the bore and the valve when the valve is in the clamlped first fuel control position to form a plurality of pairs of flow controlling ports in the valve and walls of the bore with the ports in each pair being congruent by virtue of being formed by a common tool when the valve is clamped, and thereafter unclamping the valve and removing the shim means, and longitudinally biasing the valve in a direction from the first fuel control position to a second fuel control position to define pairs of flow controlling ports, a port of a pair being offset longitudinally from the other to meter fuel flow from the valve.

5. A fuel flow distribution valve for supplying fuel from a controlled source of fuel of variable pressure to a plurality of nozzle conduits and fuel nozzles for supplying fuel to a burner of a gas turbine engine comprising valve body means having inlet means and discharge outlets formed therein, intermediate liner means forming a longitudinal valve bore in said valve body meanm including a metering bore portion and an end portion, said intermediate liner means having a transversely-extending reference surface disposed in said end bore portion, a valve slidable longitudinally in said valve bore, said valve having a metering valve portion in said metering bore portion and an extension portion with a shoulder in said end bore portion, said shoulder having a transversely-extending positioning surface facing and engageable with said reference surface and movable longitudinally with said valve to a spaced apart position from said reference surface and having a transversely-extending abutment surface facing oppositely from said positioning surface, spring means in said end bore portion abutted against said abutment surface for biasing the valve longitudinally in a direction with respect to said liner means to engage the reference surface and positioning surface, means for directing inlet fuel pressure against the valve in opposition to the spring means, a plurality of pairs of in line-machined flow metering ports machined in said liner means and valve with the ports of each pair being congruent by virtue of being machined in line when said valve is in a fixed position in said valve bore with the positioning surface spaced a preselected longitudinal distance from the reference surface to define a plurality of spaced pairs of congruent flow metering ports that independently meter fuel flow from said inlet to a respective aligned discharge outlet with each pair being in a first fuel control position when said positioning surface and reference surface are spaced apart by said preselected longitudinal distance and in a second fuel control position when said positioning surface and reference surface are engaged by bias of said spring means, said pairs of flow metering ports being movable between the first fuel control position and second fuel control position to produce a progressive alignment of the ports in each pair of ports during operation of the fuel flow distribution valve.

* * * * *